INVENTOR
WALTER J. ZENNER
BY Emery Robinson
ATTORNEY

May 7, 1957 W. J. ZENNER 2,791,637

CODE TRANSLATOR

Filed April 20, 1954 5 Sheets-Sheet 2

INVENTOR
WALTER J. ZENNER
BY Emery Robinson
ATTORNEY

INVENTOR
WALTER J. ZENNER
BY Emery Robinson
ATTORNEY

May 7, 1957

W. J. ZENNER 2,791,637

CODE TRANSLATOR

Filed April 20, 1954

5 Sheets-Sheet 4

INVENTOR
WALTER J. ZENNER
BY Emery Robinson
ATTORNEY

May 7, 1957 W. J. ZENNER 2,791,637
CODE TRANSLATOR
Filed April 20, 1954 5 Sheets-Sheet 5

INVENTOR
WALTER J. ZENNER
BY Emery Robinson
ATTORNEY

United States Patent Office 2,791,637

Patented May 7, 1957

2,791,637

CODE TRANSLATOR

Walter J. Zenner, Des Plaines, Ill., assignor to Teletype Corporation, Chicago, Ill., a corporation of Delaware Application April 20, 1954, Serial No. 424,373

15 Claims. (Cl. 179—18)

This invention pertains to code translators and more particularly to code translators wherein signals representative of a first predetermined code are utilized to actuate a translator mechanism to produce output information in the form of a second predetermined coded signal.

In the operation of automatic toll dialing telephone systems it is necessary to select proper communication routes from a plurality of possible routes in order that calls may be completed. This result may be accomplished by applying signals representative of the called number to a device called a translator wherein said applied signals are utilized to select contacts or circuits which are indicative of a route to be taken by the telephone message. It may be appreciated that in any telephone system a vast number of these translators will be utilized; consequently, it is desirable that each translator be as compact as possible due to space limitations. A further desirable feature to be incorporated in such a translator is the attainment of positive action of the operating mechanism in response to the receipt of input signals. Inasmuch as subscribers are continually being added to and taken from the telephone system and further that communication routes are being continually added or changed it is of paramount importance that the translator be readily adapted to rapid and simple changes in order to accommodate new signals or circuits and new or changed routes to the outlying subscribers.

A primary object of the present invention resides in the provision of a positive acting compact translator.

Another object of the present invention pertains to the utilization of novel simple mechanical expedients in the construction of the translator.

An additional object of the invention resides in the provision of facilities to permit rapid and easy alterations to be made in the mechanical elements comprising the translator whereby new or different input signals can be accommodated.

An object commensurate with the last object resides in facilities which permit rapid and simple changes in the output mechanical elements of the translator whereby new or different outputs are obtained.

In accordance with these last two objects a further object manifests itself in the provision of means for changing either the input or output mechanical elements independently of each other.

With these and other objects in view the present invention contemplates a mechanical translator having 40 input wires running from receiving equipment at a switching center and terminating in 40 magnets, half of which are positioned on either side of the translator. Actuation of any of the magnets causes an associated code bar from a bank of code bars to drop in a downwardly direction whereupon the code bars assume a permutated setting. Associated with and in contact with the code bars is a great number of permutatively notched input bars and upon each permutative setting of the code bars one of said input bars is selected and moved. Associated with each input bar and removably connected thereto is a permutatively notched output bar. Thus, the movement of the input bar causes its associated output bar to be likewise moved and hence selected. Selection of an output bar is followed by the energization of a press magnet which through the instrumentality of a suitable linkage moves the selected one of the output bars against a bank of contact bars. Movement of the contact bars is transmitted through novel linkages to actuate output contacts located on either side of the translator. The output contacts are thereby permutatively actuated in accordance with an output code or a circuit which is representative of the transmission path to be established for the forthcoming telephone message.

Other objects and advantages of the present invention will be apparent from the following detailed description when considered in conjunction with the accompanying drawings wherein.

Figure 1:
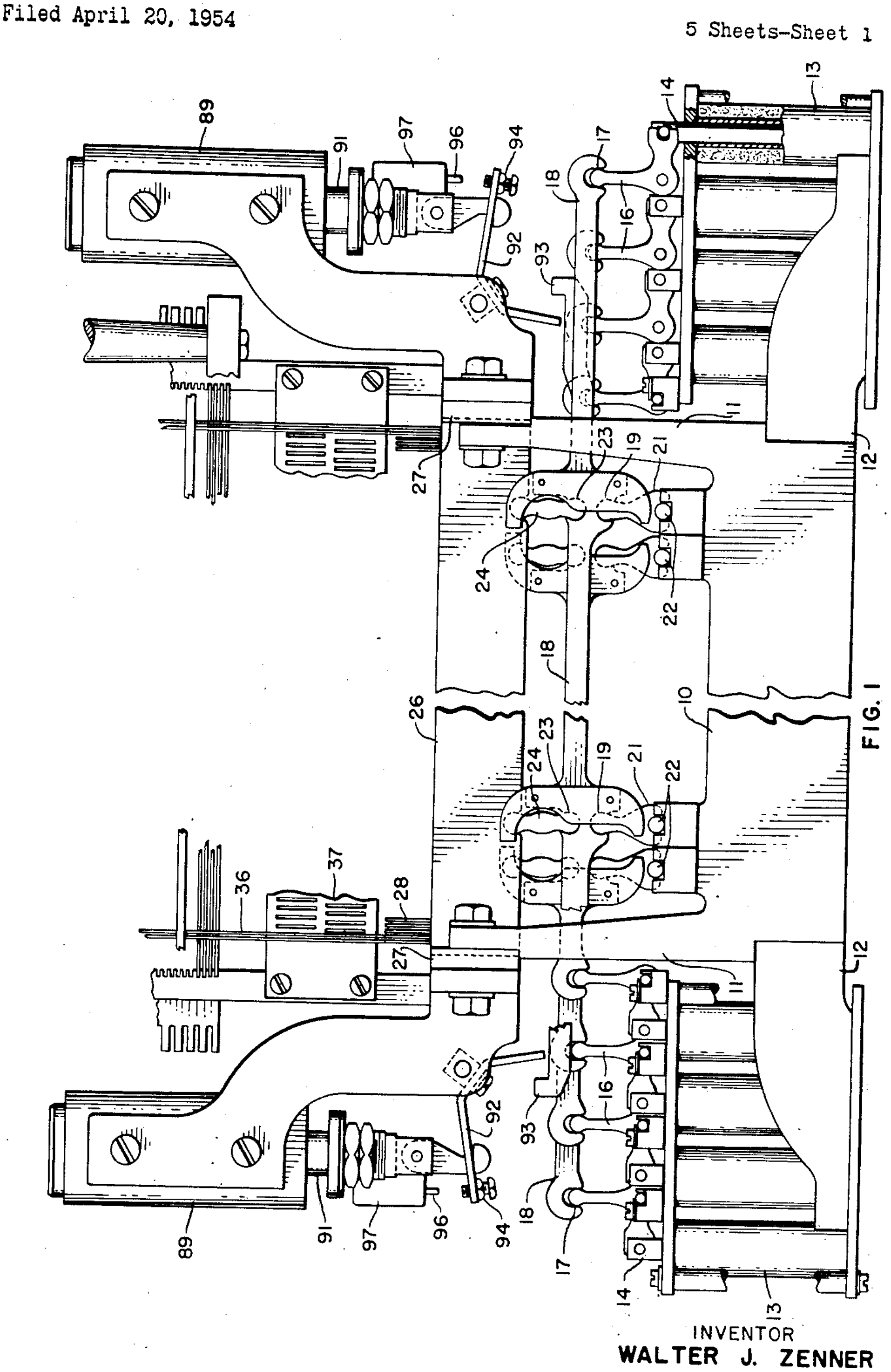
Fig. 1 is a front elevational view, partially cut away, showing the principal mechanical and electrical components of a lower half of a translator incorporating the principles and features of the present invention.
Figure 2:
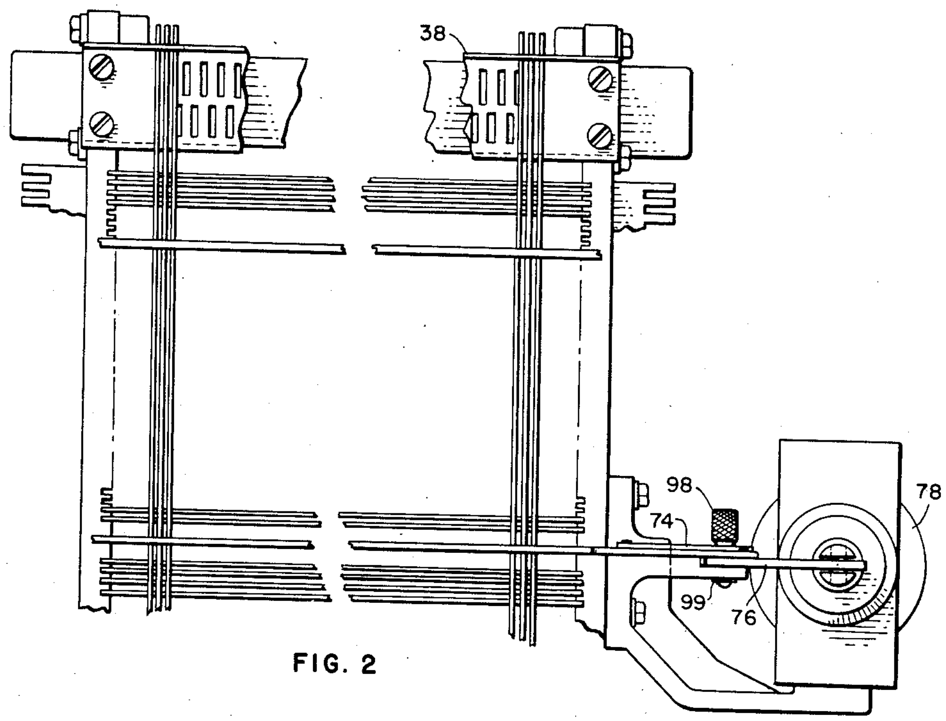
Fig. 2 is a front elevational view, partially cut away, showing the principal mechanical and electrical components of an upper half of the mechanical translator shown in Fig. 1.
Figure 3:
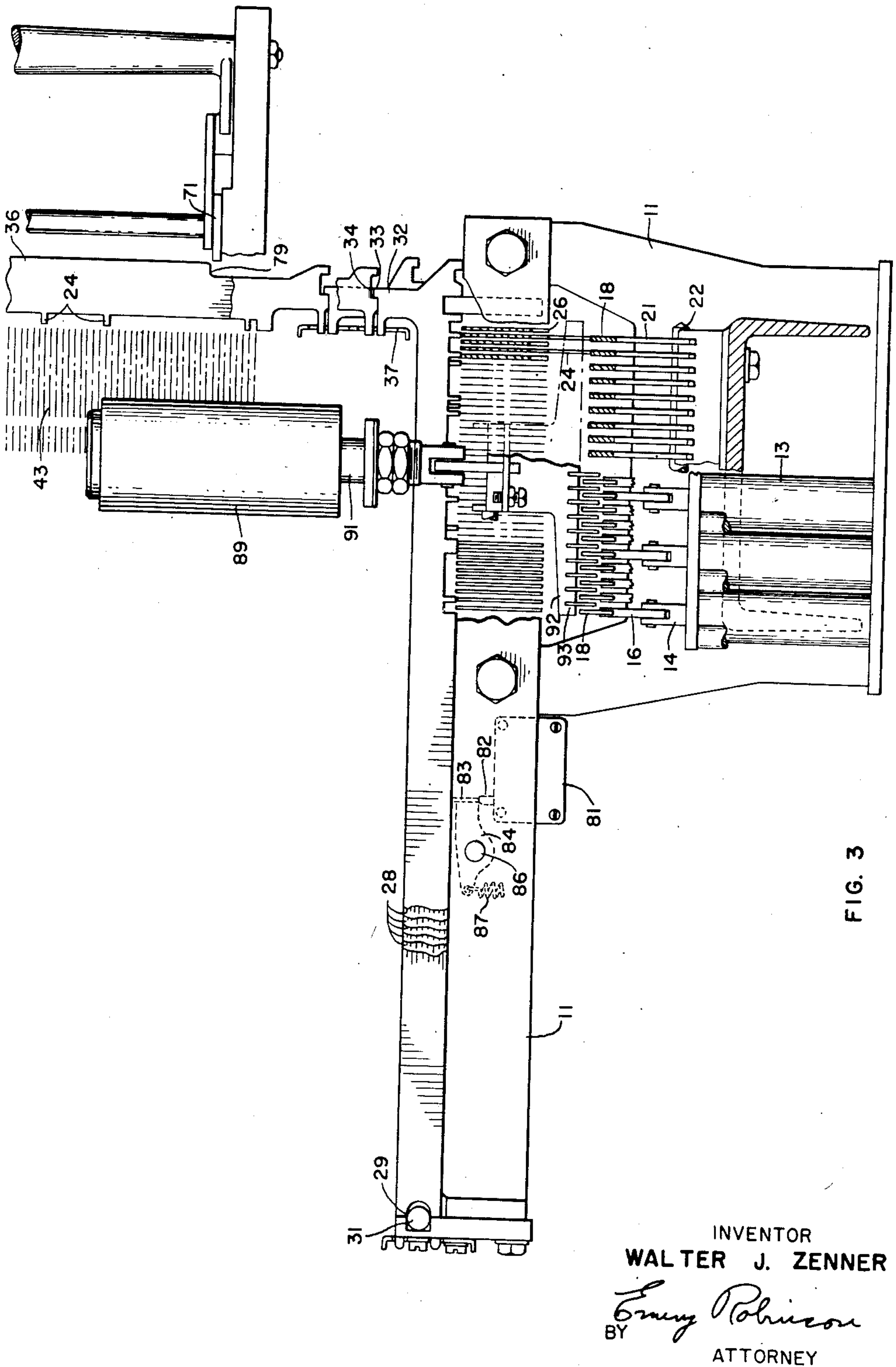
Fig. 3 is a side elevational view of that portion of the translator shown in Fig. 1 wherein certain parts and elements are shown in section to particularly illustrate the construction and operation of these elements.

Referring now to the drawings and specifically to Figs. 1, 2 and 3 wherein there is illustrated a base 10 for supporting a translator embodying the principal features of the invention. Mounted on the base 10 is a frame 11 for housing and supporting the mechanical and electrical components and assemblies of the translator. Mounted on brackets 12 extending from both sides of the base 10 is a plurality of electric magnets 13 adapted to be energized by incoming signals. In the particular embodiment shown forty such magnets are utilized and are arranged in groups of five in order to accommodate the reception of eight signals representative of eight distinct digits. The brackets 12 are each of sufficient size to hold twenty of the magnets 13. Each separate signal representative of a digit is impressed over five individual leads emanating from a subscriber's station or other switching apparatus located in the vicinity of the translator. The code utilized to energize each set of five leads is known as a "two out of five" code, that is, for each signal representative of a digit a permutation of two out of five leads will be energized.

In operative relationship with each of the magnets 13 is an armature core 14 adapted to move in a downwardly direction upon energization of its associated magnet. Attached in a pivotal manner to the upper extremity of each armature 14 is a laterally extending arm of a bell crank 16. Upwardly extending extremities of the bell cranks are rounded and fitted within arcuate slots 17 formed in one end of a group of actuator members 18.

Figure 5:
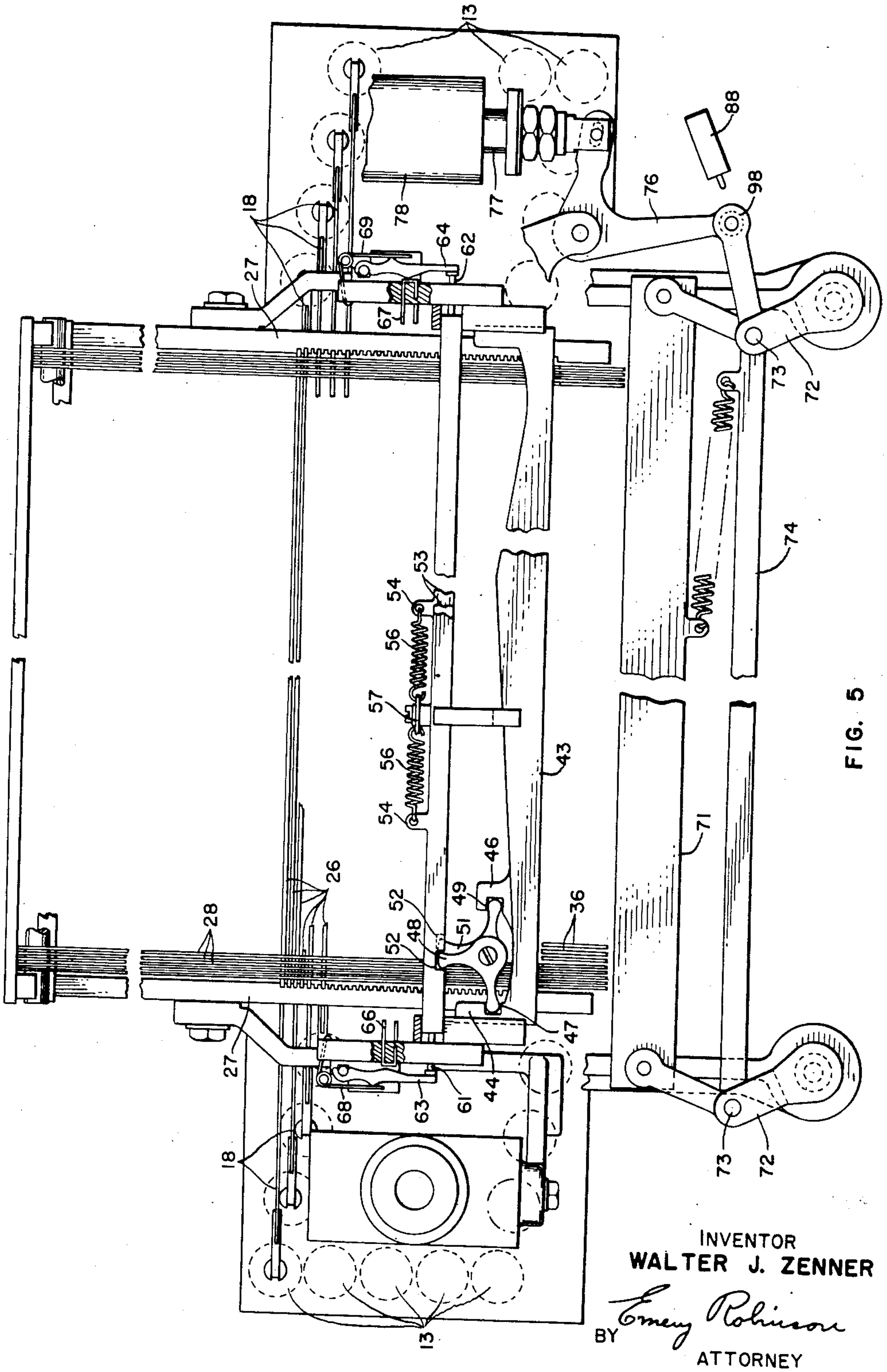
Fig. 5 is a top plan view of the translator illustrated in Figs. 1, 2, 3, and 4, wherein certain other elements are shown in their entirety or in segments to again more clearly illustrate their functional relationship with the other components of the translator.

Looking at Fig. 5 it may be readily noted that the magnets 13 are arranged in echelon fashion whereby a minimum of space is occupied and the actuator members are positioned and operated in close proximity to each other without interference. It is to be noted at this time that actuation of the magnets on both sides of the translator causes alternate ones of the actuator members to move in opposite directions.

Each of the actuator members is provided with two circular slots 19 formed along the lower edges thereof. Into each of the slots 19 is positioned a toggle link 21 pivotally mounted on a rod 22 supported by a portion of the frame 11. There is also formed along the upper edge of each of the actuator members 18 two additional circular slots 23 and positioned within each of these slots is a second toggle link 24. The upper extremity of each of the toggle links 24 is rounded so as to fit within rounded notches formed in a set of forty code bars 26 (see Figs. 1 and 3). Each of the code bars 26 is mounted within a pair of slotted guide combs 27 attached to the frame 11.

It may be thereby appreciated that actuation of any of the electromagnets 13 causes an associated armature 14 to move downwardly to pivot the bell crank 16 and as a result the actuator member 18 is moved either to the left or right as the case may be, causing the toggle links associated with that particular actuating member to collapse. The code bars 26 associated with the collapsed toggle links are thereby moved downwardly so that a permutation of code bars are permutatively selected in accordance with the character of the incoming signals supplied to the magnets 13.

Resting on the upper surfaces of each of the code bars 26 are three hundred input permutation bars 28 each having its lower engaging surface coded with a permutation of wards. Each permutation bar 28 is provided with a slot 29 as shown in Fig. 3 into which is fitted a rod 31 mounted on the frame 11 to provide a pivotal mounting. As illustrated in Fig. 3, the right-hand portion of each permutation bar 28 is provided with an upwardly extending abutment 32 and in turn each abutment is provided with a projection 33 adapted to be positioned within a slot 34 formed in the lower extremity of each one of a set of three hundred output permutation bars 36. Thus, when a group of code bars 26 are positioned in accordance with incoming signals one of said input permutation bars 28 is pivoted in a downwardly direction and as a result the associated output permutation bar 36 is moved in a downwardly direction. The lower terminuses of the input permutation bars are maintained in a spaced relationship with each other through the agency of a slotted guide plate 37. Slots are also provided in this guide plate to position the output permutation bars 36 in register with the input permutation bars. The upper extremities of the output permutation bars are maintained in position by means of a second slotted guide plate 38 secured to the upper portion of the frame 11. The upper extremities of the output permutation bars 36 are alternately cut away to provide projections 39 which are engaged and urged downwardly by music wire springs 41, however, in most instances the force of gravity is sufficient to cause the output permutation bars 36 to move downwardly when the associated input permutation bar 28 moves.

Attention is directed to the slots 34 (Fig. 3) formed in the lower extremities of the output permutation bars 36 which are of considerable width in comparison to the projections 33 extending therein, consequently, it may be appreciated that a translatory movement may be imparted to the output permutation bars to move the projections or wards 42 formed on said permutation bars against a bank of contact bars 43. Referring to the plan view shown of Fig. 5 it may be observed that the left-hand portion of each contact bar 43 has either a projection 44 or 46 extending upwardly therefrom. Projections 44 have slots 47 formed therein to accommodate one arm of each of a set of bell cranks 48. Each of the projections 46 has formed therein a slot 49 to accommodate one arm of a bell crank 51. Each of the upwardly extending arms of the bell cranks 47 and 48 are positioned within the slots 52 formed in a bank of actuator slides 53. Formed integral with each of the slides 53 is a projecting portion 54 having a hole formed therein to receive one end of a spring 56. The opposite ends of the springs 56 are secured to a plate 57 attached to the frame 11. The springs 56 exert forces on the slides 53 whereby the cranks 48 are urged in a counterclockwise direction and the cranks 51 in a clockwise direction. The contact bars 43 are therefore pressed against the wards 42 formed on the output permutation bars 36 to hold these output permutation bars in position so that the projections 33 engage the left-hand wall of the slots 34, formed in abutments 32 of input permutation bars 28 (Fig. 3). The guide plate 38 (Fig. 2) is provided with slots to engage the projections 39 of the output permutation bars 36 to prevent lateral pivotal movement from being imparted thereto.

Alternate slides 53 (Fig. 5) engage plungers 61 on the left-hand portion of the translator as viewed in Fig. 5 and the remaining slides 53 engage plungers 62 positioned on the right-hand side of the translator. Associated with the plungers 61 and 62 are pivotally mounted contact elements 63 and 64 adapted to be spaced from fixed contact elements 66 and 67. Each of the pivotally mounted contact elements 63 and 64 are spring urged by wire springs 68 and 69. The contact pairs 63 and 66—64 and 67 are connected in circuits leading to apparatus which is to be controlled by the translator.

Figure 4:
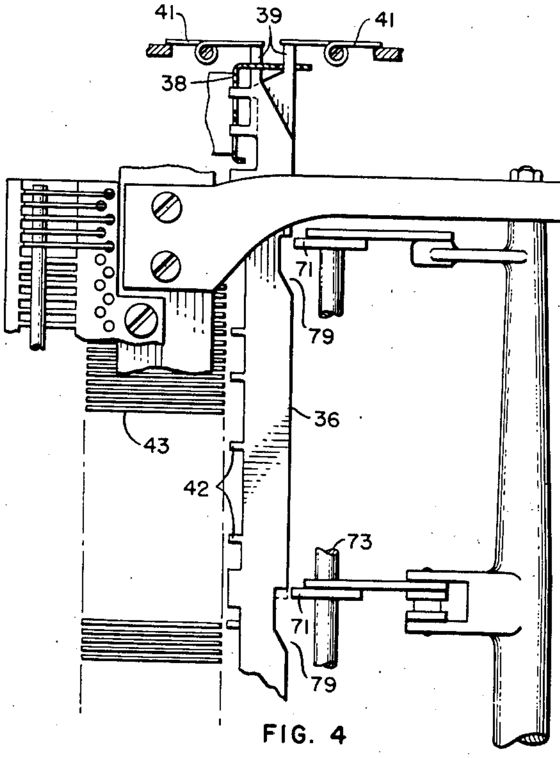
Fig. 4 is a side elevational view of that portion of the translator shown in Fig. 2 wherein certain parts and elements are shown in section to particularly illustrate the construction and operation of these elements.

Returning now to a consideration of the mechanism for imparting transverse translatory movement to the output permutation bars 36, there is positioned to the right of these permutation bars as viewed in Figs. 3 and 4 three blades 71. Connected to each end of the blades 71 are toggle linkages 72, one of which is clearly shown in Fig. 5. Each of the toggle links 72 are interconnected by means of rods 73 extending between the toggle joints. Interconnecting the two center toggle links 72 is an operating rod 74 having pivotally attached to an extension thereof one arm of a bell crank 76, the other arm of which is connected to an armature 77 associated with a press magnet 78. Each one of the output permutation bars 36 is provided with three notches 79 which are respectively positioned in register with the blades 71. When one or more of the output permutation bars 36 are selected, the unnotched portion of that permutation bar is moved into register with the blade 71. It may be therefore understood that energization of the press magnet 78 causes the armature 77 to move upwardly to pivot the bell crank 76 in a counterclockwise direction thereby straightening all of the toggles 72. As the toggles 72 straighten, the blades 71 connected thereto are moved against the unnotched portions of the selected output permutation bars 36 to move these selected bars towards the left as viewed in Figs. 3 and 4. Obviously the wards 42 formed on the selected output permutation bars 36 engage and move the contact bars positioned in alignment with the wards.

Energization of the press magnet 78 is obtained by means of a press magnet contact 81 attached to the frame 11 (Fig. 3). Specifically, the contact 81 is closed by a plunger 82 which engages a blade 83 underlying all of the input permutation bars 28. Blade 83 is connected to a lever 84 pivotally mounted about a stud 86 and urged in a counterclockwise direction by a spring 87. Manifestly, the selection of any input permutation bar 28 in response to the receipt of the signal depresses the blade 83 to move the plunger 82 down to close the contact 81 and thereby complete a circuit to energize the press magnet 78.

In order to restore the code bars 26 to the initial position, a plunger operated contact 88 (Fig. 5) is positioned in register with the crank arm 76 so that when the crank arm 76 is pivoted to its full extent the contact 88 is closed to effectuate the energization of a pair of code bar reset magnets 89 (Fig. 1). Cognizance should be taken of the fact that at the time the reset magnets 89 are energized, the selected contacts 63 and 66 are closed and the information indicated by the closure of these contacts is transferred to any piece of output apparatus which is adapted to store and utilize such information, consequently, the translator may be reconditioned for subsequent operation. Upon energization of the magnets 89, associated armatures 91 are drawn up to pivot L-shaped arms 92 in a clockwise direction to move downwardly extending sections into engagement with projections 93 formed on the operated actuator members 18. Continued movement of the L-shaped arms 92 moves the actuator members 18 to the left or to the right as viewed in Fig. 1 depending upon which actuator members have been operated. The horizontal extending portion of each L-shaped arm 92 has mounted thereon an adjustable screw 94 which engages plungers 96 to open the holding contacts 97 which are connected to effectuate the de-energization of the code bar reset magnets 89 thereby allowing the armatures 91 to drop to the rest position as shown in Fig. 1. The apparatus is now in condition to receive another set of signals and to perform another translating operation.

The construction of the translator permits rapid change or replacement of the input permutation bars 28 and the output permutation bars 36 without changing both of said sets of bars. Referring to Figs. 3 and 4 it may be seen that when it is desired to replace one of the bars 28 the associated output permutation bar 36 may be raised a slight amount to withdraw the slot 34 from abutting relationship with the projection 33 formed on the input permutation bar. The slot 31 and rod 29 provides a pivot joint which allows withdrawal of the input permutation bar. It is then a simple matter of placing a new input permutation bar with new wards formed thereon into the vacated space.

In order to replace one of the output permutation bars 36 it is necessary to withdraw the blades 71 from the bars 36 to permit the selected output permutation bar to be raised and then pivoted outwardly. This is accomplished by removing a pin 98 (see Fig. 2) forming the pivotal joint between the connecting rod 74 and the bell crank 76 (see Fig. 3) whereupon the toggle joints 72 may be completely collapsed to withdraw the blades 71 a sufficient distance to permit the output permutation bar to pivot so that it will clear the abutment 32 formed on the associated input permutation bar. Obviously it is a simple matter to then insert the new output permutation bar with different arrangements of wards formed thereon in the vacated space. A cotter pin 99 is provided for the pin 98 to prevent the pin from working loose during the operation of the translator.

Figure 6:
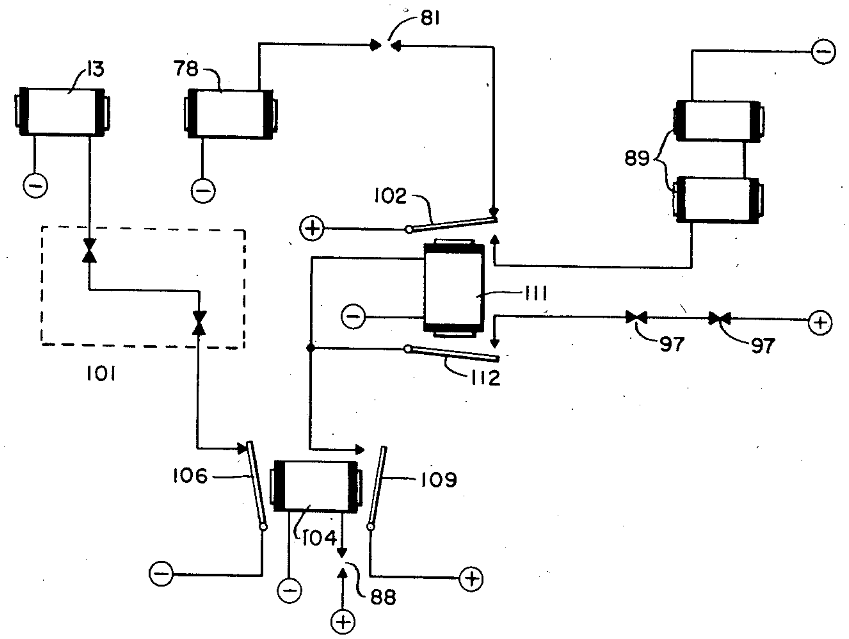
Fig. 6 is a circuit diagram showing the electrical components utilized to control the operation and restoration of the translator.

Recapitulating briefly on the overall operation of the translator with particular reference to Fig. 6, it may be seen that signals originate at a source generally designated by reference numeral 101. Each signal is sent over five leads to the electromagnets 13, however, only one each of said leads and magnets 13 are shown in Fig. 6 for purposes of simplification of the disclosure as it may be readily understood that the other leads and magnets are merely duplications. The permutation of magnets 13 energized on the left-hand side of the translator, viewed in Fig. 1, causes the actuator members 18 to move to the left thereby collapsing the toggle links 21—24 associated therewith and the permutation of magnets 13 on the right-hand portion of the translator cause the associated actuator members 18 to move towards the right to again collapse the toggle linkages 21—24 associated therewith. As each toggle link collapses, an associated code bar 26 drops in a downwardly direction. Each of the three hundred input permutation bars 28 is originally equipped with forty wards so that the coding on any one consists of removing all the wards between the ones corresponding to a particular code, thus when a permutation of code bars representing the particular signal is dropped only one permutation bar 28 will be permitted to follow the dropped code bars 26. Inasmuch as each input permutation bar 28 supports at its free end a vertically positioned output permutation bar 36, as best illustrated in Fig. 3, the supported output permutation bar will likewise move in a downwardly direction. Upon the completion of the selection of any one of the input permutation bars 28, the contact 81 (see Figs. 3 and 6) is operated. Closure of the contact 81 instantly energizes the press magnet 78 through a circuit which may be traced from positive battery through a normally closed contact 102, through the now closed contact 81, through the press magnet 78 to negative battery. Energization of the press magnet causes the associated toggle links 72 to be straightened and as a result the press blades 71 are moved against the selected output permutation bar 36. It will be noted that since the unselected permutation bars have not been dropped, the blades 71 will move into their respective notches, thus preventing any horizontal motion from being imparted to the unselected bars.

When a particular output permutation bar 36 is selected, the combination of wards 42 formed thereon represents the output information desired. The movement of the output permutation bar moves the wards formed thereon into engagement with the contact bars 43 which transmit the motion through the bell cranks 48 and 51 to the slides 53. Thus slides 53 which are operated by the bell crank 47 move towards the right as viewed in Fig. 3 and those slides operated by the bell cranks 51 are moved towards the left. The net result of the movement of the slides 53 is the closure of the corresponding contact bars 63 and 66 located on both the left and right-hand side of the translator with their associated stationary contacts 66 and 67.

Considering now the restoration of the translator to the initial position: the movement of the bell crank 76 closes the contact 88 (see Figs. 5 and 6) to energize a magnet 104. Energization of this magnet draws up a contact 106 101 thereby removing the initial signal condition set up connected between positive battery and the signal source therein.

Energization of the magnet 104 also draws up an armature contact 109 to complete a circuit which may be traced from positive battery through the now drawn up armature 109, through a magnet 111, to negative battery. Energization of the magnet 111 draws up the contact 102 to engage its lower stationary contact to complete a circuit running from positive battery, through the now drawn up armature contact 102, through the code bar reset magnets 89 to negative battery. When the armature contact 102 moved from its upper contact, the circuit to the press magnet 78 was interrupted; consequently the toggle mechanism associated with the press magnet is restored to its initial position permitting the selected output permutation bar to be restored through the agency of the extended spring 56 exerting a force through operated slide 53, through bell cranks 48 or 51, through the contact bar 43 and then to the selected output permutation bar 36. As soon as the toggle straightens the contact 88 is opened to de-energize magnet 104 thereby releasing armature contact 109 to remove positive battery from magnet 111.

The opening of contact 109 removes a source of positive battery from magnet 111 but this is ineffective to de-energize magnet 111 because the initial energization of the magnet 111 also effectuated the drawing up of a lower armature contact 112 to complete a holding circuit for the magnet 111 which may be traced from positive battery through the contacts 97 associated with the now de-energized code bar restore magnets 89, through the now drawn up armature contact 112, through the magnet 111 to negative battery.

Energization of the code bar restore magnets 89 effectuates a pivotal movement of the associated L-shaped arms 92 whereupon these arms, after a short period, engage the projections 93 of the selected actuator members 18 and return these members to the initial position. When the L-shaped arms 92 have completed their pivotal movement, the screws 94 secured thereto engage the plungers 96 to open the contacts 97. It is to be recalled that the holding circuit for the magnet 111 included the normally closed contacts 97, consequently, the holding circuit for the magnet is interrupted to restore the circuit to the condition indicated in Fig. 6.

Figure 7:
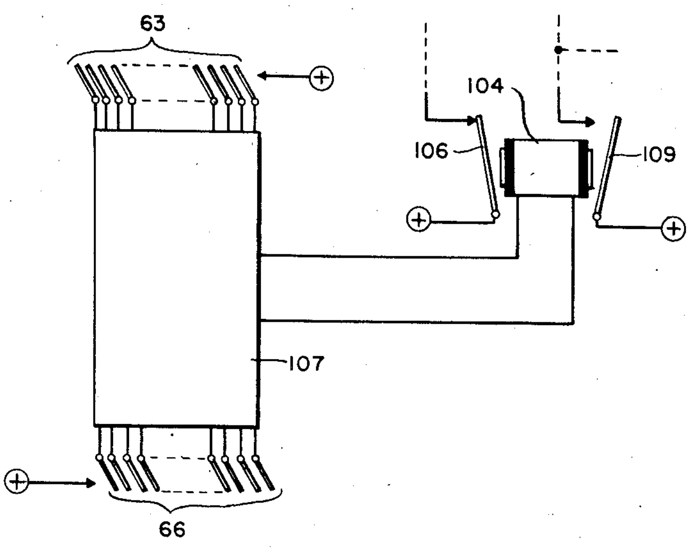
Fig. 7 is a circuit diagram depicting a modified circuit for operating and resetting the translator.

Referring to Fig. 7, there is shown a modified control circuit for the translator. In the modified embodiment the contact 88 is eliminated and the restoration of the translator is initiated by an impulse generated by a piece of apparatus to which the output of the translator is applied. Fig. 7 shows only a portion of the circuit since the remainder is identical with that shown in Fig. 6 and wherever components are identical in the two figures identical numerical designations are employed. In this figure the apparatus to which the output of the translator is applied is shown as a block diagram denoted by the reference numeral 107. The particular apparatus is unimportant to a consideration of the present invention and need only be provided with means for generating a momentary impulse upon receipt of a translated signal from the translator. This momentary impulse is impressed over leads to energize the magnet 104 whereupon a sequence of translator restoration operations are initiated which are identical to the operations heretofore explained with respect to the embodiment of the control circuit shown in Fig. 6.

It is to be understood that the above described arrangements of apparatus and construction of elements parts are simply illustrative of the applications of the principles of the invention and many other modifications, alterations and changes may be made without departing from the invention.

What is claimed is:

1. A translating device comprising a first group of movably mounted bars, each of said first bars being notched in accordance with a first permutative code, a second group of movably mounted bars individually juxtapositioned with said first group of bars, each of said second bars being notched in accordance with a second permutative code, a plurality of collapsible means for engaging the unnotched portions of the first bars to hold the first group of bars from movement, means for urging the second bars into engagement with the first bars, and means controlled by incoming code signals for permutatively collapsing certain of the holding means in accordance with the received signal to permit movement of one of said first code bars into a selected position in conformity with the notches on said code bar whereby the associated second bar also moves into a selected position.

2. A translating device as defined in claim 1 having a bank of contact mechanisms, and means for moving the selected second bar against said bank of contact mechanisms whereby a pattern of contact mechanisms are actuated in accordance with the unnotched portions of said selected second bar.

3. In a code translator, a series of movably mounted code bars, means responsive to a series of signals for permutatively positioning the code bars, a group of pivotally mounted input coded bars, each of said input bars having formed thereon a set of permutatively arranged wards which are in engagement with said coded bars, a group of slidably mounted output coded bars each of which is individually held from movement by individual input coded bars, each of said output bars being provided with a series of permutatively arranged wards, means for urging each output bar into engagment with each input bar whereby the permutative positionment of the code bars effectuates a selection of both an input coded bar and an associated output coded bar, a bank of contact mechanisms, and means actuated by the selection of any of said input bars for moving the selected output bar and the wards thereon against said bank of contact mechanisms.

4. In a code translator, a group of pivotally mounted first coded bars, a group of movably mounted second coded bars positioned so that each of said second coded bars engages one of said first coded bars, a plurality of code bars for holding said first coded bars from pivotal movement, toggle linkages connected to each of said code bars for holding said code bars, means responsive to signals for collapsing certain of said toggle linkages whereby said code bars are positioned in a permutative pattern to permit one of said first coded bars to pivot, and means for urging the second coded bars to follow the movement of the first coded bars so that pivotal movement of a first coded bar is accompanied by movement of the associated second coded bar.

5. In a code translator, a plurality of pivotally mounted bars, means responsive to signals for selecting and pivoting one of said bars, a plurality of second bars mounted for both transverse and longitudinal sliding movement, each of said second bars being held against longitudinal movement by individual ones of said pivotally mounted bars, means for urging the second bars to longitudinally move to follow the pivoted movement of associated first bars, and means for transversely sliding the second bars that have completed a longitudinal movement.

6. In a code translator, a plurality of code bars, toggle action means for holding the code bars in place, means equal in number to the code bars for receiving signals and actuating certain of the toggle action means to select a pattern of code bars, a bank of pivotally mounted first coded bars adapted to be individually selected by the establishment of said pattern of code bars, a bank of second coded bars mounted for both longitudinal and transverse translatory movement, means for urging said second coded bars in the longitudinal direction to follow the movement of said pivotally mounted coded bars, and means actuated by the selection of a pivotally mounted coded bar for imparting a transverse translatory movement to a selected second coded bar.

7. In a code translator, a group of code bars, toggle linkages connected to each code bar for holding said code bars in an unselected position, a first group of signal receiving magnets positioned beyond the first ends of the code bars, a second oppositively disposed group of signal receiving magnets positioned beyond the other ends of the code bars, actuating members connected to each of said toggle linkages adapted to collapse the toggle linkages, means controlled by the energization of the first group of magnets in response to signals for moving certain of the actuating members in a first direction, means controlled by energization of the second group of magnets in response to signals for moving the remainder of the actuating members in an opposite direction, and guide means for insuring movement of the code bars in a common direction when associated toggle linkages are collapsed.

8. In a code translator, a plurality of magnets adapted to be energized in accordance with a series of intelligence signals representative of a multi-digit number, a pair of oppositely disposed guide combs, a bank of code bars positioned between said combs and adapted to slide therein, toggle linkages secured to said code bars for holding said code bars in an unselected position, means associated with each magnet and actuated thereby for collapsing one of said toggle linkages whereby the code bars are permutatively positioned in accordance with the incoming signal, a set of coded input bars having a series of permutatively arranged wards thereon in juxtaposition to said code bars, a series of output coded bars having a series of permutatively arranged wards thereon, means for urging each output bar into engagement with an input bar whereby the permutative positionment of the code bars permits the urging means to move one of said input bars and the associated output bar into a selected position.

9. In a code translator, a first group of movably mounted coded bars, a second group of movably mounted coded bars individually positioned in abutting relation to individual ones of said first group of coded bars, each of said second bars being notched in accordance with a permutative code, means for holding said first group of coded bars from movement, means operated by incoming signals for moving certain of the holding means to select a coded bar in the first group, means for urging the second group of coded bars into engagement with the first group of coded bars whereby movement of one of said first coded bars selects a second coded bar, two blanks of contacts oppositely disposed from each other, actuator slides positioned between said bank of contacts and individually associated with individual contacts, linkages associated with each slide adapted to move said slide in a direction to close its associated contact, and means actuated by the selection of a first coded bar for moving the selected second coded bar into position to actuate a pattern of linkages in accordance with unnotched portion of said selected second coded bar.

10. In a code translator, a group of movably mounted code bars, a first group of movably mounted permutatively notched bars supported by said code bars, a second group of movably mounted permutatively notched bars separately supported on one end by individual ones of said first permutatively notched bars, means for holding the code bars from movement, means responsive to incoming signals for accordingly disabling certain of said holding means whereby a pattern of code bars is moved to permit the movement of a first permutatively notched bar which in turn permits the movement of a second permutatively notched bar, and means for restoring the holding means to the initial position.

11. In a code translator, a group of slidably mounted code bars, a group of pivotally mounted first coded bars supported by said code bars, a group of slidably mounted second coded bars individually supported by individual ones of said first coded bars, toggles for holding the code bars from movement, means responsive to incoming signals for accordingly collapsing certain of said toggles whereby a permutation of code bars is moved to select a first coded bar for movement which in turn permits the movement of one of said second coded bars, an electromagnet adapted to be operated following selection of said second coded bar, and means controlled by said electromagnet for restoring said toggles to the initial straightened position.

12. In a code translator as defined in claim 11 having means for de-energizing the electromagnet upon restoration of the toggles to the straightened position.

13. In a code translator, a plurality of signal responsive means, a plurality of code bars equal in number to the number of signal responsive means, toggle linkages interconnecting each signal responsive means with one of said code bars whereby actuation of a signal responsive means causes a translatory movement to be imparted to a corresponding code bar, a bank of pivotally mounted first permutation bars engaging said code bars, each of said first permutation bars having a permutation of notches formed therein whereby one of said first permutation bars is pivoted upon each setting of the code bars, a second bank of permutation bars mounted for both transverse and longitudinal sliding movement, each of said second permutation bars engaging one of said first permutation bars whereby pivotal movement of one of said first permutation bars causes an associated one of said second permutation bars to longitudinally slide, each of said second permutation bars being provided with a permutation of projections therefrom, a bank of contact bars overlying said second bank of permutation bars, means operated by the pivotal movement of any of said first permutation bars for transversely sliding the selected one of said second bank of permutation bars into engagement with a permutation of said contact bars in accordance with the projections on said second permutation bars, and means operated by said last mentioned means for removing the signal applied to the signal responsive means.

14. In a code translator, a plurality of first coded bars mounted for pivotal movement, a plurality of second coded bars mounted for both transverse and longitudinal translatory movement, each of said second bars precluded from longitudinal translatory movement by one of said first bars, means for holding said first coded bars from pivotal movement, means responsive to incoming signals for accordingly disabling certain of the holding means to permit one of said first coded bars to move into a selected position whereby a longitudinal translatory movement is imparted to one of said second coded bars, said second coded bars being provided with a set of notches, a set of blades positioned in register with said notches, means operated by the pivotal movement of any of said first coded bars for moving the blades into engagement with the unnotched portion of the selected second coded bar to impart a transverse translatory movement to said selected second coded bar.

15. In a code translating apparatus, a first set of movably mounted coded members, a plurality of means for holding said first coded members from movement, a second set of coded members, means for mounting said second coded members for movement with and transverse of said first set of coded members, means for urging said second members into engagement with said first coded members to force said first coded members against said holding means, means responsive to a coded signal for rendering ineffective certain of said holding means to permit one of said first coded members to move in conformity with the code thereon whereby a second coded member is also moved therewith, and means for imparting a transverse movement to the moved second coded member.

References Cited in the file of this patent

UNITED STATES PATENTS

| | | |
|---|---|---|
| 2,364,446 | Hubbard | Dec. 5, 1944 |
| 2,528,161 | Miloche | Oct. 31, 1950 |
| 2,605,965 | Shepherd | Aug. 5, 1952 |
| 2,636,398 | Lens | Apr. 28, 1953 |